H. J. GUTTMAN.
DOUGH CUTTER.
APPLICATION FILED APR. 15, 1907.
946,898.
Patented Jan. 18, 1910.
2 SHEETS—SHEET 2.
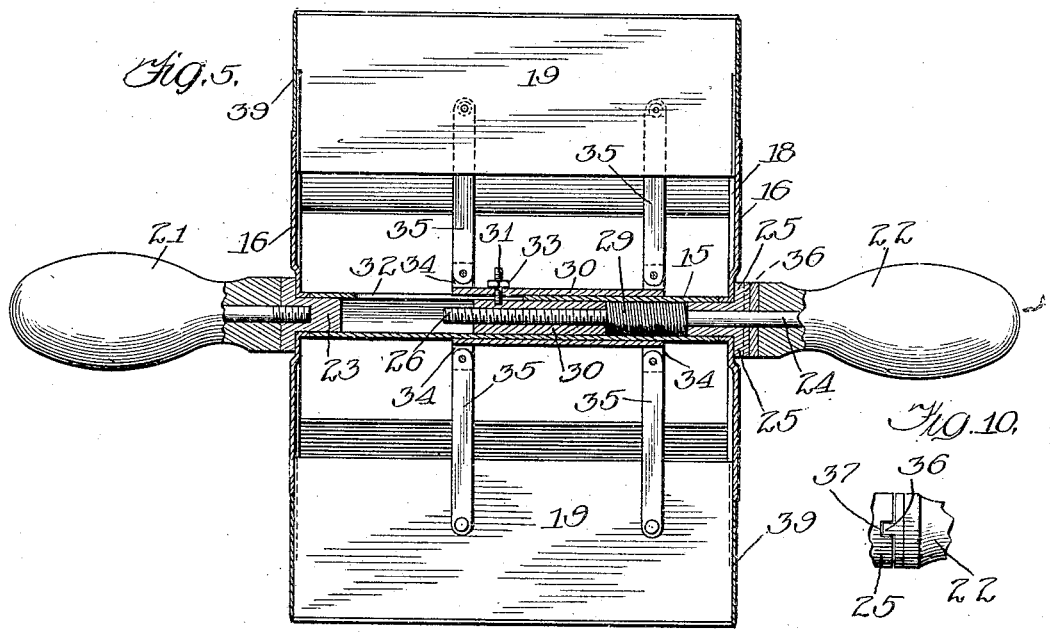
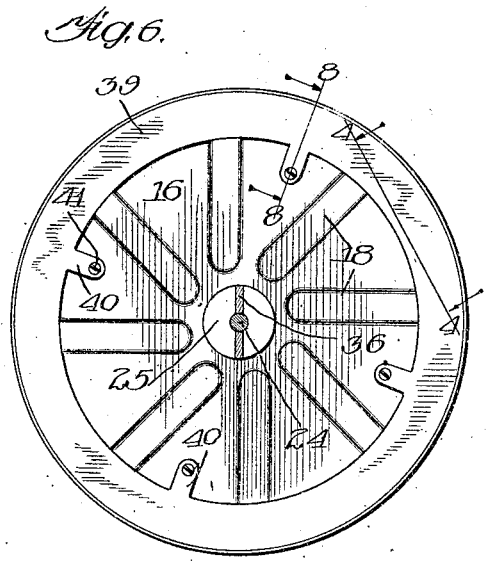
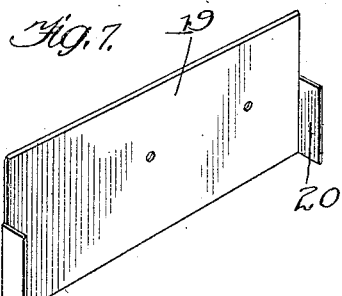
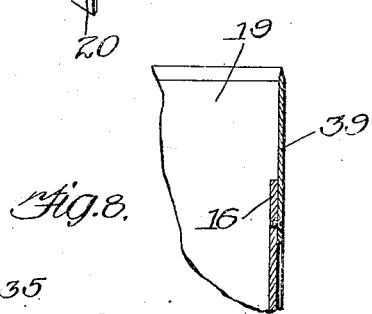
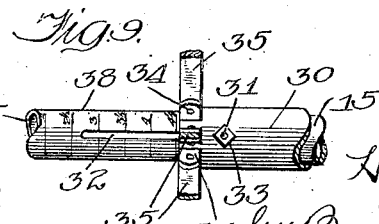
Witnesses:
Robert H. Weir
J. H. Jochum Jr.
Inventor:
H. J. Guttman
by Brown & Hopkins
Attys

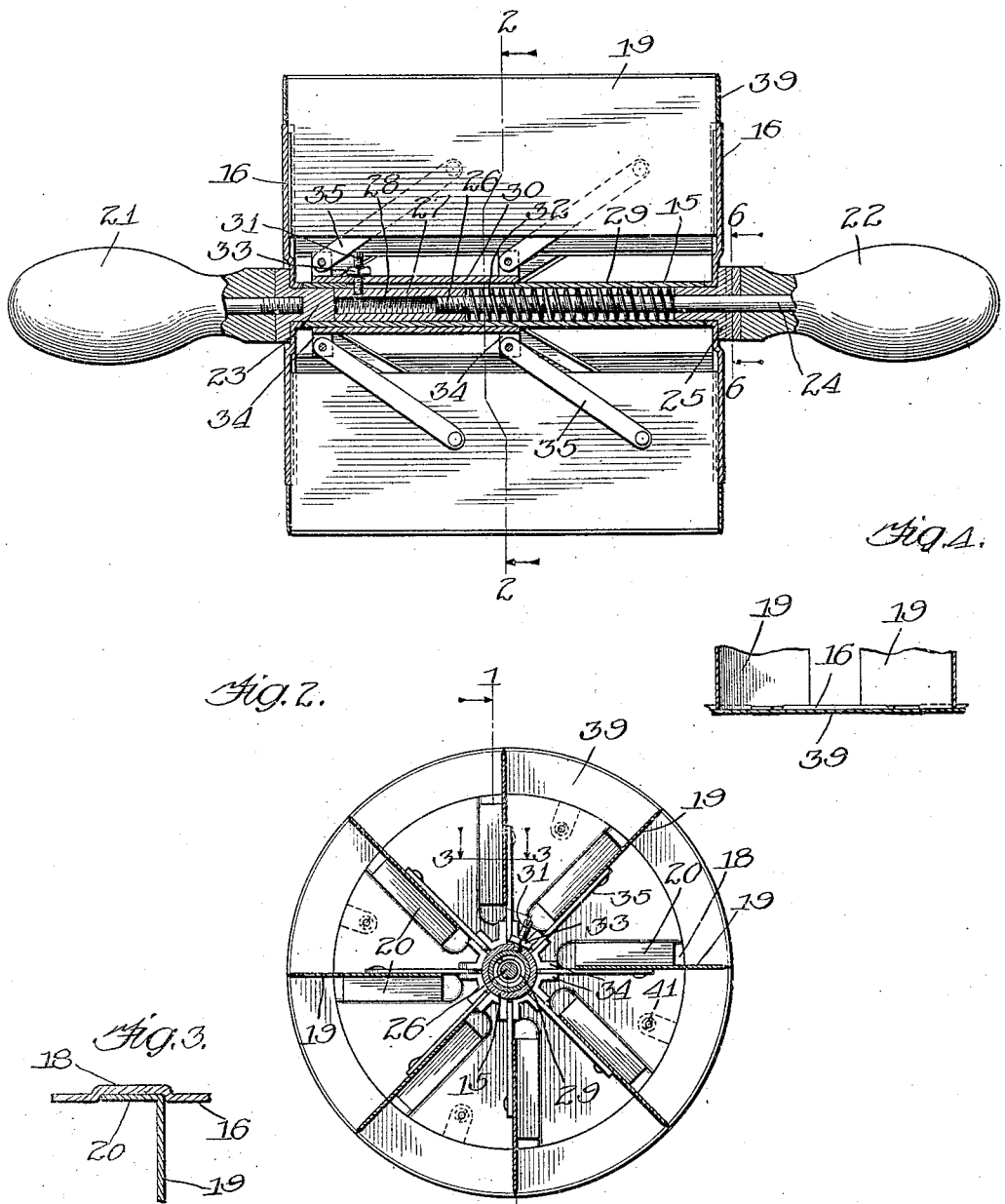

UNITED STATES PATENT OFFICE.

HARRY J. GUTTMAN, OF CHICAGO, ILLINOIS, ASSIGNOR TO EDWARD KATZINGER CO., OF CHICAGO, ILLINOIS, A CORPORATION OF ILLINOIS.

DOUGH-CUTTER.

946,898.  Specification of Letters Patent.  Patented Jan. 18, 1910.

Application filed April 15, 1907. Serial No. 368,191.

*To all whom it may concern:*

Be it known that I, HARRY J. GUTTMAN, a citizen of the United States, residing at Chicago, in the county of Cook and State of Illinois, have invented certain new and useful Improvements in Dough-Cutters, of which the following is a specification.

This invention relates to improvements in dough cutters and particularly to cutters of a roller construction, and the primary object of the invention is to provide an improved cutter of this character adapted to cut the dough into uniform pieces.

A further object is to provide an improved cutting roller of this character which may be readily adjusted to vary the sizes of the pieces cut and improved means for indicating the adjustment.

A further object is to provide an improved cutting roller provided with end cutters adapted to coöperate with the side cutters to completely sever the pieces of dough.

A further object is to provide an improved cutting roller of this character provided with separate end cutters adapted to be applied to the end rollers and which are of a diameter to correspond with the adjustment of the side cutters.

A further object is to provide an improved hand cutting roller of this character which will be simple and durable in construction, capable of easy adjustment and effective and efficient in operation.

To the attainment of these ends and the accomplishment of other new and useful objects, as will appear, the invention consists in the features of novelty in the construction, combination and arrangement of the several parts hereinafter more fully described and claimed and shown in the accompanying drawings, illustrating an exemplification of the invention, and in which—

Figure 1 is a longitudinal sectional view on line 1—1 of Fig. 2. Fig. 2 is a transverse sectional view on line 2—2 of Fig. 1. Fig. 3 is a detail sectional view on line 3—3 of Fig. 2. Fig. 4 is a detail sectional view on line 4—4 of Fig. 6. Fig. 5 is a longitudinal sectional view similar to Fig. 1, showing the cutting blades in an adjusted position. Fig. 6 is an end elevation taken on line 6—6 of Fig. 1. Fig. 7 is a detail perspective view of one of the cutting blades. Fig. 8 is a detail sectional view on line 8—8 of Fig. 6. Fig. 9 is a detail perspective view of the hub of the roller, showing the graduations of the adjustment of the cutting blades. Fig. 10 is a detail view of the preferred form of locking means for the adjusting handle.

Referring more particularly to the drawings and in this exemplification of the invention, the roller preferably comprises a hub 15 of tubular formation and of any desired length, to the ends of which are secured suitable heads 16 of any desired diameter. These heads are provided with spaced, recessed portions 18, which extend from points approximately adjacent the diametric center thereof to the periphery and are located so as to open from the inner faces of the heads.

Suitable cutting blades 19 are provided with laterally projecting flanges or portions 20, which preferably extend from the ends of the blade and terminate short of the outer or cutting edges thereof and said blades 19 are of such a length as to extend completely across the space between the heads 16 of the roller parallel with the hub 15 and in such a manner that the flanges or portions 20 will enter and move within the recesses 18, which latter serve as guides for the cutter and prevent the same from becoming displaced.

Suitable handles 21, 22, are provided for the roller, the handle 21 being rigidly secured to the outer face of one of the heads 16 and is provided with a reduced extremity 23, which latter is adapted to enter and project for a slight distance within the hub 15. The other handle 22 is provided with a projecting rod or bar 24, which extends through a suitable bearing 25, secured to the other head 16 of the roller and said rod or bar 24 is provided with a threaded extremity 26 which extends for some distance within the hub 15.

Slidingly mounted within the hub 15 is a nut or member 27, which is provided with a threaded aperture 28 which preferably extends entirely through the nut or member 27 and is adapted to receive the threaded extremity of the rod or bar 24. A yielding member, such as a coil spring 29 or the like, is disposed within the hub 15 between the end of the bearing 25 and the adjacent end of the nut or member 27 and said member 29 surrounds the rod or bar 24 for a purpose to be set forth.

Slidingly mounted upon the hub 15 is a sleeve or collar 30, which is connected or secured to the nut or member 27 within the hub by means of a suitable screw or bolt 31 which passes through the sleeve or collar 30, a suitable slot or aperture 32 in the hub 15 and with its extremity engaging the nut or member 27, so that when the handle 22 is rotated, the rod or bar 24 will also be rotated so that the threaded extremity 26 thereof will draw the nut or member 27 and sleeve or collar 30 forwardly or force it backwardly according to the direction of rotation of the handle 22, as will be understood. If desirable, a suitable jam-nut 33 may be provided on the screw or bolt 31 to prevent displacement of the same when adjusted. The sleeve or collar 30 is provided at its extremities with coöperating projecting ears or lugs 34 and pivotally connected by one end to the ears or lugs 34 are links 35. The other end of these links are pivotally connected to the blades or cutters 19 and said links 35 are of such a length that when the nut or member 27 is in engagement with the stop or reduced portion 23 of the handle 21, the links will permit the blades 19 to be drawn closely toward the hub 15 of the roller and when the handle 22 is adjusted so as to draw the nut or member 27 to the position shown more clearly in Fig. 5 of the drawings, the links 35 will extend or force the blades 19 to project for some distance beyond the blades 16 of the roller.

In order to prevent the handle 22 from being rotated to adjust the blades 19 during the operation of cutting the dough, any suitable locking means may be provided and a simple and efficient means for accomplishing this purpose comprises a projection or rib 36, which extends transversely across the lower face of the handle 22 and said projection or rib is adapted to enter and be seated within a coöperating groove or depression 37 in the adjacent face of the bearing 25. With this construction, it will be noted that the tension of the spring or yielding member 29 will tend to draw the projection 36 into the groove or depression 37 and when it is desired to adjust the blades 19, all that is necessary is to draw the handle 22 against the tension of the yielding member 29 and rotate the handle to adjust the nut or member 27 and when the proper adjustment has been attained, the handle 22 may be released and placed into a position to permit the projection or rib 36 to be seated in the groove 37.

In order to ascertain the degree of adjustment of the cutting edge of the blades 19 or to provide means whereby the blades may be adjusted to cut the dough into predetermined sizes, a suitable indicator may be provided and this indicator preferably comprises a series of graduations 38 on the hub 15 and said graduations are so arranged that one end of the sleeve or collar 30 is adapted to coöperate therewith, as a pointer or indicator.

In order to completely sever the pieces of dough by cutting the edges simultaneously with the sides, suitable cutting rings or rims 39 may be provided and these rings are preferably provided with projecting ears 40, which extend toward the diametric center of the rings. These rings are of varying sizes to meet the requirements of the different adjustments of the cutting blades 19 and are secured in position with relation to the ends of the blades 19 by engaging and resting upon the periphery of the heads 16, so that the ears or projections 40 will engage and rest against the outer face of the respective head 16 and said rings may be held in position in any suitable manner, preferably by means of screws or bolts 41 passing through the ears or projections and into the heads 16, the periphery of the rings 39 being formed into cutting edges to coöperate with the cutting edges of the blades 19.

From the above, it is thought that the operation will be clear but briefly stated, it is as follows: Assuming the parts to be in position as shown in Fig. 1, with the cutting edges of the blades 19 projecting beyond the heads 16, a sufficient distance to cut the smallest piece of dough and the cutting rings 39 in position to coöperate with the blades 19 to cut the ends of the pieces of dough, the cutter may be rolled across the dough in the usual manner. When it is desired to cut the dough into larger pieces, the specific cutting ring 39 may be first removed and the handle 22 may be then rotated in the manner already set forth to adjust the nut or member 27 and the sleeve or collar 30, which will force the cutting edges of the blades 19 outwardly through the medium of the connecting links 35 and said sleeve or collar 30 may be adjusted until its end registers with the desired graduation 38. With the blades thus adjusted, the cutting ring 39 of the proper size, that is, of a size that the cutting edge thereof will be in a position to coöperate with the cutting edge of the blades 19, may be placed and secured in position in the manner already set forth and when thus secured in position, the cutter may be operated or rolled across the dough in the manner as before. Thus it will be seen that the cutter may be readily adjusted to cut the dough into any desired sizes. When the cutter is adjusted to the position as shown in Fig. 1, that is, so as to cut the dough into the smallest sizes, the end of the nut or member 27 will engage and rest against the reduced extremity 23 of the handle 21 which acts as a stop and serves to resist the pressure upon the ends of the blades 19 to prevent straining of the parts.

In order that the invention might be fully understood by those skilled in the art, the details of the foregoing embodiments thereof have been thus specifically described but

What I claim as new therein and desire to secure by Letters Patent is—

1. A dough cutting roller containing a plurality of cutters extending longitudinally of the roller and means for simultaneously adjusting the cutters.

2. A dough cutting roller containing a plurality of radially adjustable cutters extending longitudinally of the roller, and means for simultaneously adjusting the cutters.

3. In a dough cutting roller, the combination of a plurality of cutters arranged longitudinally of the roller, supports for the cutters, a handle for the roller and means for simultaneously adjusting the cutters on the supports with relation to each other.

4. In a dough cutting roller, the combination of a plurality of longitudinally disposed cutters, supports for the cutters, a handle for the roller and means operatively related to the handle for adjusting the cutters on the support.

5. In a dough cutting roller, the combination of a hub, cutting blades supported by and extending longitudinally of the hub, a member mounted for sliding movement on the hub, a flexible connection between the member and the blades and means for moving the member longitudinally on the hub to radially adjust the blades.

6. In a dough cutting roller, the combination of a hub, longitudinal cutting blades supported by the hub, a member mounted for sliding movement on the hub, flexible connections between the member and the blades, a handle and means operatively related to the handle for longitudinally moving the member on the hub to simultaneously adjust the blades radially.

7. In a dough cutting roller, the combination of a plurality of longitudinally disposed cutters, supports for the cutters, a handle for the roller, means for adjusting the cutters on the supports with relation to each other and means for locking the adjusting means.

8. In a dough cutting roller, the combination of spaced longitudinal blades having cutting edges, supports for the blades, a handle for the roller, and means operatively related to the handle and the blades for adjusting the blades to vary the position of the cutting edges with relation to each other.

9. In a dough cutting roller, the combination of a plurality of longitudinally disposed cutters, supports for the cutters, the ends of the cutters engaging the supports and having a sliding engagement therewith, a handle for the roller and means operatively related to the handle for radially adjusting the cutters on the supports.

10. In a dough cutting roller, the combination of a plurality of cutters adjustable toward and away from the axis of said roller, supports for the cutters, said supports being provided with guide ways slidably engaging said cutters to permit their adjustment, a handle for the roller, and means operatively related to the handle and the cutters for adjusting the cutters in the guideways.

11. In a dough cutting roller, the combination of a plurality of spaced longitudinal cutters, supports for the cutters, a handle, and a flexible connection between the handle and the cutters for adjusting the cutters with relation to each other.

12. In a dough cutting roller, the combination of a plurality of spaced longitudinal cutters, supports for the cutters, handles for the roller, and means operatively related to one of the handles for radially adjusting the cutters with relation to each other.

13. In a dough cutting roller, the combination of a plurality of spaced longitudinal cutters, supports for the cutters, handles for the roller, means operatively related to one of the handles for radially adjusting the cutters with relation to each other, and interengaging means on the handle and one of the supports for locking the adjusting means.

14. In a dough cutting roller, the combination of a plurality of spaced longitudinal cutters, supports for the cutters, handles for the roller, means operatively related to one of the handles for radially adjusting the cutters with relation to each other, interengaging means on the handle and one of the supports for locking the adjusting means, and yielding means for holding the locking means in engagement.

15. In a dough cutting roller, the combination of a hub, spaced heads supported by the hub, spaced cutters adjustably mounted on the heads, handles for the roller, a member slidingly mounted on the hub, flexible connections between the member and the blades, and means operatively related to one of the handles for adjusting the cutters radially.

16. In a dough cutting roller, the combination of a hub, a plurality of radially projecting cutters, supports for the cutters, a handle for the roller, a member mounted for sliding movement on the hub, links one end of which are pivotally connected to the member and the other ends to the blades, and means operatively related to the handle and the member, for adjusting the cutters radially on the supports.

17. In a dough cutting roller, the combination of a hub, spaced cutters, supports for the cutters, a member mounted for sliding movement on the hub, a flexible connection between the member and the blades, a handle, and an adjustable connection between the handle and the member for moving the cutters radially on their supports.

18. In a dough cutting roller, the combination of a hub, spaced cutters, supports for the cutters, a member mounted for sliding movement on the hub, a flexible connection between the member and the blades, a handle, an adjustable connection between the handle and the member for moving the cutters radially on their supports, and a yielding locking means for the adjustable connection.

19. In a dough cutting roller, the combination of a tubular hub, spaced cutters, supports for the cutters, a member mounted for sliding movement on the hub, a flexible connection between the member and the cutters, a member movable within the hub, means for connecting the said members, a handle, and means operatively related to the handle and the member within the hub for moving the said other member to adjust the cutters.

20. In a dough cutting roller, the combination of a tubular hub, spaced cutters, supports for the cutters, a member mounted for sliding movement on the hub, a flexible connection between the member and the cutters, a member movable within the hub, means for connecting the said members, a handle, and an adjustable connection between the handle and the member within the hub for moving the said other member to adjust the cutters.

21. In a dough cutting roller, the combination of a tubular hub, spaced cutters, supports for the cutters, a member mounted for sliding movement on the hub, a flexible connection between the member and the cutters, a member movable within the hub, means for connecting the said members, a handle, an adjustable connection between the handle and the member within the hub for moving the said other member to adjust the cutters, and a yielding lock for the adjusting means.

22. In a dough cutting roller, the combination of a tubular hub, spaced cutters, supports for the cutters, a member mounted for sliding movement on the hub, a flexible connection between the member and the cutters, a member within the hub, means for securing the two members to move in unison, the member within the hub being provided with a threaded aperture, and a handle, said handle being provided with a threaded extension projecting into the hub and engaging the threaded aperture in the member whereby the rotation of the handle will move the member to adjust the cutters.

23. In a dough cutting roller, the combination of a tubular hub, spaced cutters, supports for the cutters, a member mounted for sliding movement on the hub, a flexible connection between the member and the cutters, a member within the hub, means for securing the two members to move in unison, the member within the hub being provided with a threaded aperture, a handle, said handle being provided with a threaded extension projecting into the hub and engaging the threaded aperture in the member whereby the rotation of the handle will move the member to adjust the cutters, and means for locking the handle against rotation.

24. In a dough cutting roller, the combination of a tubular hub, spaced cutters, supports for the cutters, a member mounted for sliding movement on the hub, a flexible connection between the member and the cutters, a member within the hub, means for securing the two members to move in unison, the member within the hub being provided with a threaded aperture, a handle, said handle being provided with a threaded extension projecting into the hub and engaging the threaded aperture in the member whereby the rotation of the handle will move the member to adjust the cutters, and yielding means operatively related to the handle and the hub to lock the handle against rotation.

25. In a dough cutting roller, the combination of a tubular hub, spaced supports on the hub, spaced cutters mounted for sliding movement on the supports, a member mounted for sliding movement on the hub, flexible connections between the member and the cutters, a member within the hub, a rotatable handle, a bearing for the handle, a threaded connection between the handle and the member within the hub, means for connecting the two said members together and for holding the member within the hub against rotation, whereby the rotation of the handle will move the member to adjust the cutters, interengaging means on the handle and hub for locking the handle against rotation and an elastic member within the hub disposed between the member and the said bearing for holding the locking means in engagement.

26. In a dough cutting roller, the combination of a tubular hub, spaced heads on the hub, a plurality of radial cutters parallel with the hub and between the heads, the ends of said cutters having sliding engagement with the heads, a member mounted for sliding movement on the hub, flexible connections between the member and the blades, a member within the hub, said member being provided with a threaded aperture, means for securing the members to move in unison, a handle provided with a threaded projecting portion, and a bearing, said projecting portion on the handle projecting into the hub through the bearing and having engagement with the threaded aperture in the member whereby the rotation of the handle will move the said member to adjust the cutters.

27. In a dough cutting roller, the combination of a tubular hub, supports on the hub, cutters mounted for sliding movement on the supports, a member mounted for sliding movement on the hub, flexible connections between the members and the cutters, a member within the hub, said hub being provided with a slot, means passing through the slot for securing the members to move in unison, a rotatable handle, and an adjustable connection between the handle and the member within the hub whereby the rotation of the handle will move the members to adjust the cutters.

28. In a dough cutting roller, the combination of a hub, supports on the hub, cutters mounted for sliding movement on the supports, a member mounted for sliding movement on the hub, flexible connections between the member and the cutters, a rotatable handle, an adjustable connection between the handle and the member whereby the rotation of the handle will move the member to adjust the cutters, and an indicator for indicating the adjustment of the cutters.

29. In a dough cutting roller, the combination of a hub, supports on the hub, cutters mounted for sliding movement on the supports, a member mounted for sliding movement on the hub, flexible connections between the member and the cutters, a rotatable handle, and an adjustable connection between the handle and the member whereby the rotation of the handle will move the member to adjust the cutters, said hub being provided with a series of graduations with which the said member is adapted to coöperate for adjusting the cutters.

30. In a dough cutting roller, the combination of spaced heads, a hub located between the heads, said heads being provided with guideways in their inner faces, cutting blades, the ends of which are mounted for sliding movement in the guideways, said blades being provided with lateral projecting flanges also movable in the guideways, an independently movable handle, and an adjustable connection between the handle and the blades whereby the movement of the handle will adjust the blades in the guideways.

31. In a dough cutting roller, the combination of spaced heads, a hub located between the heads, said heads being provided with guideways in their inner faces, cutting blades, the ends of which are mounted for sliding movement in the guideways, said blades being provided with lateral projecting flanges also movable in the guideways, an independently movable handle, an adjustable connection between the handle and the blades whereby the movement of the handle will adjust the blades in the guideways, and means for locking the handle against adjustment.

32. In a dough cutting roller, the combination of a hub, spaced heads secured to the hub, a plurality of cutting blades between the heads and parallel with the hub, the ends of the blades having sliding engagement with the heads, a member, flexible connections between the member and the blades, means for moving the member to adjust the blades, end cutters surrounding the heads and resting upon the peripheries thereof and means for removably securing the end cutters in position, the active edge of the end cutters coöperating with and extending in a direction transverse to the active edge of the said blades.

33. In a dough cutting roller, the combination of a plurality of cutters arranged longitudinally of the roller, and means movable longitudinally of the roller simultaneously adjusting the cutters.

34. A dough cutting roller, comprising a plurality of cutters, and means for imparting a simultaneous radial adjustment to said cutters.

35. In a dough cutting roller, the combination of a hub, supports mounted on said hub, a plurality of cutters carried by said supports, a handle for the roller, a member slidably mounted on the hub, links, each of said links being pivotally connected to one end of the member and at the other end to one of the cutters, and means operatively related to the handle and to the member for imparting a radial adjustment to said cutters.

In testimony whereof I have signed my name to this specification, in the presence of two subscribing witnesses, on this 12th day of April, A. D. 1907.

HARRY J. GUTTMAN.

Witnesses:
   FRANCIS A. HOPKINS,
   CHAS. H. SEEM.